Feb. 22, 1949.   W. B. HEINZ ET AL   2,462,097
CONTROL SYSTEM
Filed April 6, 1944   6 Sheets-Sheet 3

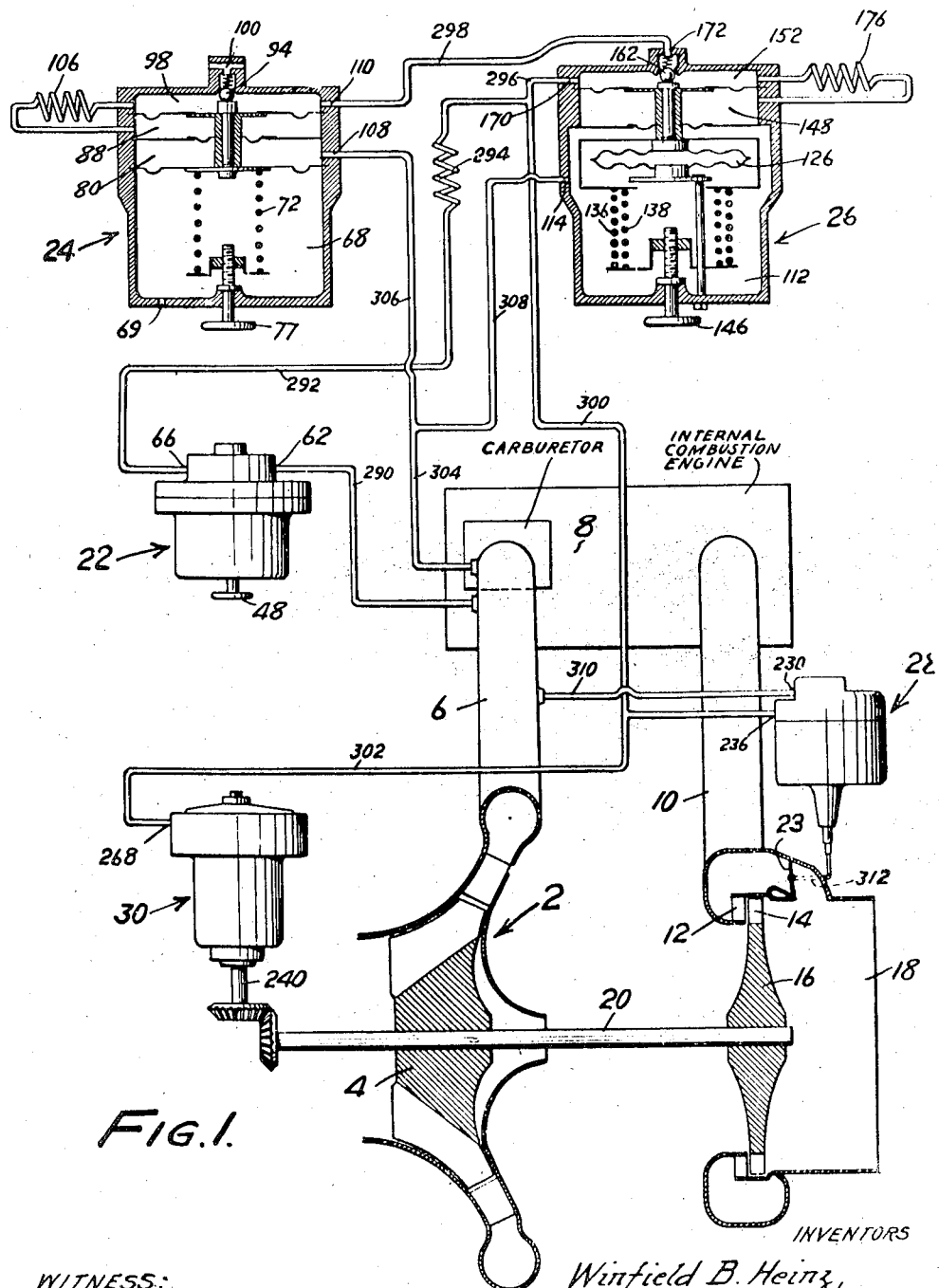

INVENTORS
Winfield B. Heinz,
Arthur E. Kittredge &
John G. Williams
BY
Bussere Harding
ATTORNEYS.

WITNESS:

Patented Feb. 22, 1949

2,462,097

UNITED STATES PATENT OFFICE 2,462,097

CONTROL SYSTEM

Winfield B. Heinz, Bound Brook, and Arthur E. Kittredge, Audubon, N. J., and John G. Williams, Philadelphia, Pa.; said Williams assignor, by mesne assignments, to Turbo Engineering Corporation, a corporation of Delaware, and said Heinz and Kittredge assignors, by mesne assignments, to Penn Industrial Instrument Corporation, a corporation of Pennsylvania Application April 6, 1944, Serial No. 529,764

15 Claims. (Cl. 230—5)

This invention relates in its broader aspects to a control system for the purpose of effecting controlling operations in response to a plurality of variable conditions. A more specific aspect of the invention relates to the use of such a control system for the maintenance of the pressure delivered by a centrifugal compressor at a value which exceeds both some minimum gauge pressure and some minimum absolute pressure. A still more specific aspect of the invention relates to such control of a centrifugal compressor which is driven by a gas turbine, particularly where the turbo-compressor unit is associated with an engine for supercharging purposes as in applications to aircraft.

Considering the specific application of the invention to a supercharging system for aircraft engines, a requirement for proper operation of the engine is that the supercharging air pressure be maintained above some minimum absolute value and, at the same time, at approximately some constant gauge value so long as the minimum absolute value is exceeded. One object of the present invention is to provide a control system which will achieve this end. Considering, for example, variation of atmospheric pressure from sea-level pressure to low pressure at high altitude, the control is adapted at low altitude to maintain a supercharging pressure which exceeds, by a predetermined amount, the atmospheric pressure, i. e., a constant gauge pressure. This condition is maintained by the control until the atmospheric pressure drops to such an extent that the constant gauge pressure theretofore maintained would reach the minimum allowable absolute pressure. With further drop of atmospheric pressure, therefore, the control is adapted to maintain a substantially constant absolute pressure.

Coupled with these controls is a further control to insure against excessive speed of the turbo-compressor unit. A further object of the present invention is the interlocking of this control with the pressure control to insure the overriding of the pressure control in the event of excess speed conditions.

A further object of the invention is the provision of controls of the general type indicated for wider application. This object relates to the interrelating of controls in such fashion as to provide successive or overriding actions under predetermined conditions.

Still other objects of the invention relate to the provision of improved control elements.

These and other objects of the invention will become apparent from the following description, read in conjunction with the accompanying drawings, in which:

Figure 1 is a diagrammatic layout of a control system provided in accordance with the present invention and associated with a supercharging unit for an aircraft engine;

Figure 3:
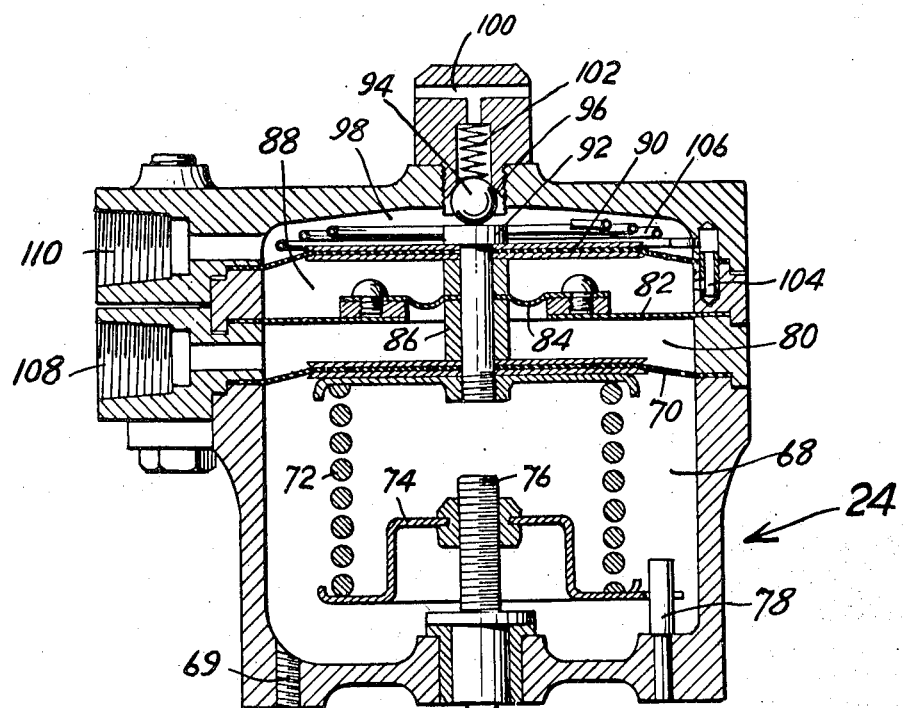
Figure 3 is a vertical section through a gauge pressure control or relay.

The control system applied to an aircraft supercharger is illustrated in Figure 1 in which a centrifugal compressor indicated at 2 provided with an impeller 4 is illustrated as arranged to deliver compressed air through the passage 6 for the combustion of fuel in the internal combustion engine 8, carburetion being carried out in conventional fashion. The exhaust gases from the engine pass through a connection 10 to the nozzles 12 of an exhaust gas turbine, directing driving gases into the buckets 14 thereof provided in the rotor 16, the exhausted gases being discharged through the tail passage 18. A common shaft 20 for the turbine rotor and the impeller provides the connection whereby the former drives the latter. It will be understood that the turbo-compressor combination is merely illustrated diagrammatically and the turbo-compressor elements may be of any suitable type, the compressor, for example, being of multiple-stage type rather than single-stage as illustrated. A waste gate 23 provides for the bypass of exhaust gases from the connection 10 directly to the tail passage 18 away from the turbine nozzles.

The devices associated with the control are indicated diagrammatically in Figure 1 and comprise a pressure regulator 22 designed to provide a supply of air at a pressure having a predetermined value above atmospheric pressure, a gauge pressure relay 24, an absolute pressure relay 26, a waste gate motor 28, and a speed controller 30. Before describing the connections and functions of these elements, they will be specifically described with reference to Figures 2 to 6, inclusive.

Figure 2:
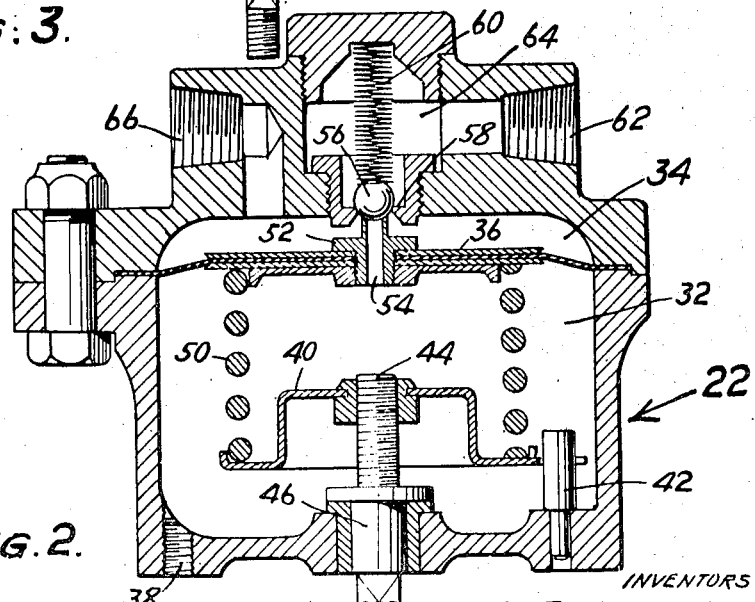
Figure 2 is a vertical section through a pressure regulator forming a part of the control system.

The pressure regulator 22 is illustrated in Figure 2 and comprises a housing providing a lower chamber 32 and an upper chamber 34 separated by a flexible diaphragm 36. The lower chamber 32 is open to the atmosphere at 38. Within the lower chamber there is provided a seat 40 restrained against rotation by a pin 42 but arranged to be axially adjustable by a screw 44 threaded thereinto and carried by a shaft 46 subject to adjustable rotation by a knob 48 (Figure 1). Manipulation of this knob serves to adjust the pressure exerted by a spring 50 upwardly against the diaphragm 36, the spring being seated upon the adjustable seat 40.

The diaphragm 36 carries a central fitting 52 provided with a bore 54 upon which may seat a ball valve 56 which is also adapted to seat at 58 to close an opening between the chamber 34 and a space 64 provided in the upper portion of the casing. A light spring 60 urges the ball 56 downwardly. A connection 62 is arranged to supply compressed air at variable pressure to the chamber 64 while a connection 66 serves as an outlet from the chamber 34.

This pressure regulator serves to provide at the outlet 66 a pressure which is to a predetermined extent above atmospheric pressure, when a variable pressure in excess of the pressure to be delivered is applied at 62. As will be evident from the construction, the upper side of the diaphragm 36 is subjected to the pressure existing at 66 while the under side is subjected to atmospheric pressure plus the force of the spring 50. When the pressure at 66 drops below a value corresponding to the atmospheric pressure plus a certain pressure corresponding to the compression of the spring 50, the diaphragm 36 may move upwardly carrying the ball 56 off the seat 58 so that air is admitted to the chamber 34 from the supply at 62. As the pressure in the chamber 34 increases, the diaphragm 36 will move downwardly until the ball 56 seats at 58, cutting off the supply to the chamber 34, and any excess pressure in the chamber 34 will be bled off to the atmosphere through the bore 54 as the diaphragm moves downwardly away from the seated ball 56. As a consequence of this arrangement it will be evident that a predetermined gauge pressure will be maintained in the connection 66 between very close limits, the operation normally involving no more than a very minute clearance of the ball 56 with its respective seats.

The gauge pressure control 24 is illustrated in Figure 3 and comprises a casing providing a lower chamber 68 closed at its top by a flexible diaphragm 70 against which there presses upwardly the compression spring 72 resting upon a seat 74 restrained against rotation by a pin 78 entering an opening therein and adjustable by means of the threaded end 76 of an adjustable shaft journaled in the casing and subject to adjustment by means of a knob 77 (Figure 1). The diaphragm 70 provides the lower closure for a chamber 80, the top of which is provided by a rigid diaphragm 82 with a flexible central portion 84 connected to a stem assembly 86 carried by the diaphragm 70. Above the diaphragm 82, 84 is another chamber 88 closed by a flexible diaphragm 90 also connected to the stem assembly 86 which, above that diaphragm, is provided with an end 92 adapted to engage a ball 94 and press it against a seat 96 to close an upper chamber 98 against escape of air to the atmosphere through the connection 100, a light spring 102 being provided to tend to unseat the ball 94 whenever the stem assembly 86 moves downwardly. The chambers 88 and 98 are connected through a flow restriction comprising a connection 104 and a capillary tube 106. The restriction thus provided may be made of adjustable type, but in general this is unnecessary, the capillary tube being chosen as to length and bore so as to provide the necessary restriction of flow to achieve the proper reset action as described hereafter. The chamber 68 is open to the atmosphere at 69 while chambers 80 and 98 have the respective external connections 108 and 110 which will be described hereafter.

Figure 4:
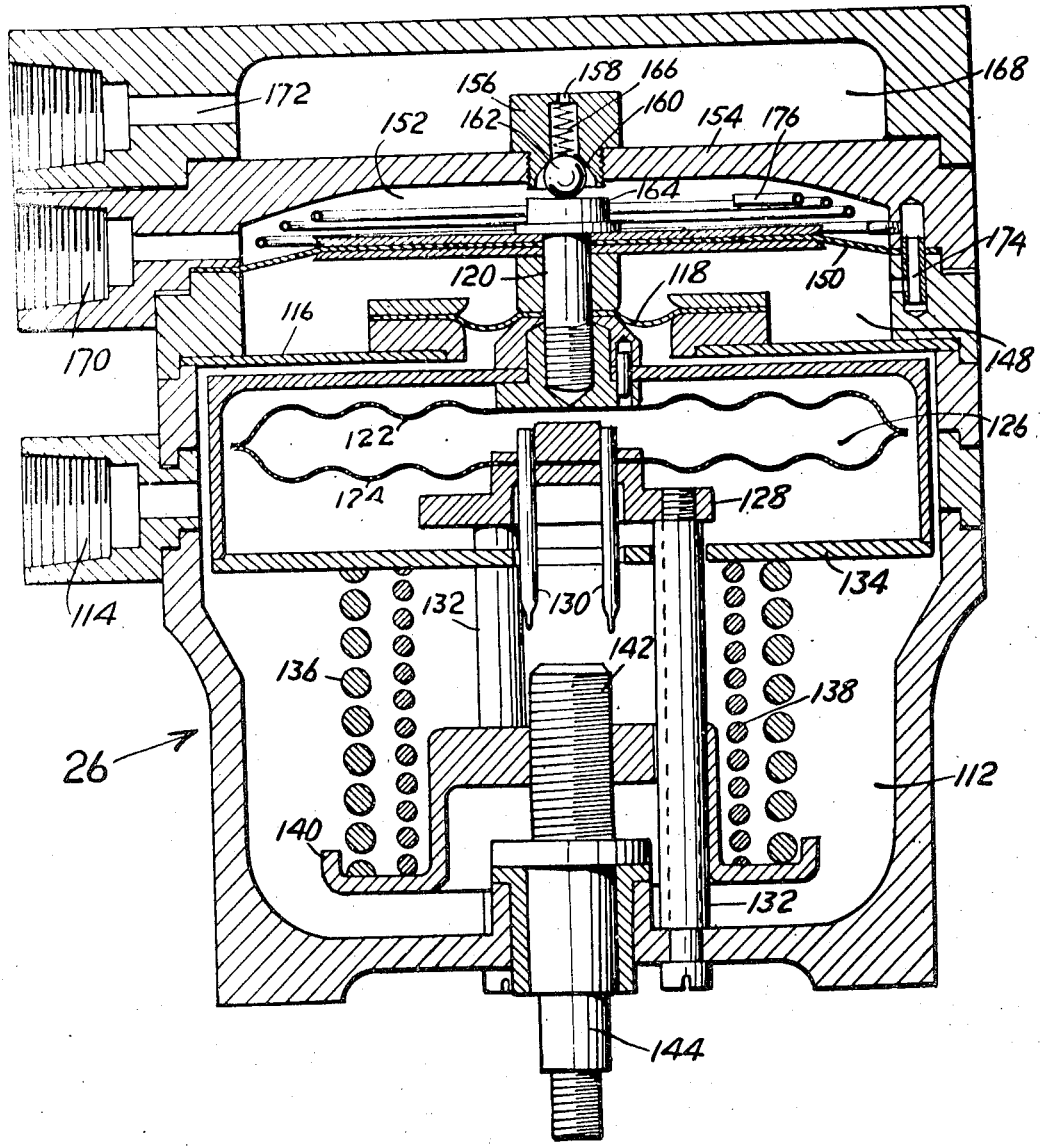
Figure 4 is a vertical sectional view through an absolute pressure control or relay.

The absolute pressure relay 26 is illustrated in Figure 4. It comprises a casing providing a lower chamber 112 which is closed except for the connection illustrated at 114. The upper portion of this chamber is formed by the rigid diaphragm 116 provided with a flexible central portion 118 connected to a stem assembly 120. The lower end of the stem assembly 120 is connected to the upper side 122 of a flexible vacuum chamber 126 the lower side 124 of which is fixed to a member 128 supported by posts 132. The sealed off connections through which the chamber 126 was evacuated are indicated at 130.

The stem assembly 120 is extended downwardly about the vacuum chamber 126 by a box-like rigid structure indicated at 134 which is subject to upward pressure by springs 136 and 138 resting upon a seat 140 restrained against rotation by the passage of the supports 132 through openings therein but being slidable therealong by threaded engagement with the portion 142 of the shaft 144 adapted to be rotatably adjusted by a knob 146 (Figure 1).

Above the diaphragm 116, 118 is a chamber 148 closed at its upper side by a flexible diaphragm 150 connected to the stem assembly 120. Above this diaphragm is still another chamber 152 having a rigid top 154 provided with a central fitting 156 having a bore 158 adapted to be closed by a ball valve 162 resting upon a seat 160 and urged downwardly by a light spring 166. The ball is pressed upwardly towards seating position by the head 164 of the stem assembly 120. Above the wall 154 is a chamber 168 with which the opening 158 communicates and which is provided with an external connection 172. The chamber 152 is provided with an external connection 170. Flow between the chambers 148 and 152 is controlled by a connection 174 and a capillary tube 176 located within the chamber 152 and of such length and bore as to provide frictional resistance to air flow between the chambers. As in the case of the similar capillary tube 106 of Figure 3, this may be made adjustable if desired, though in general for a particular design it may provide a fixed resistance as illustrated.

Figure 5:
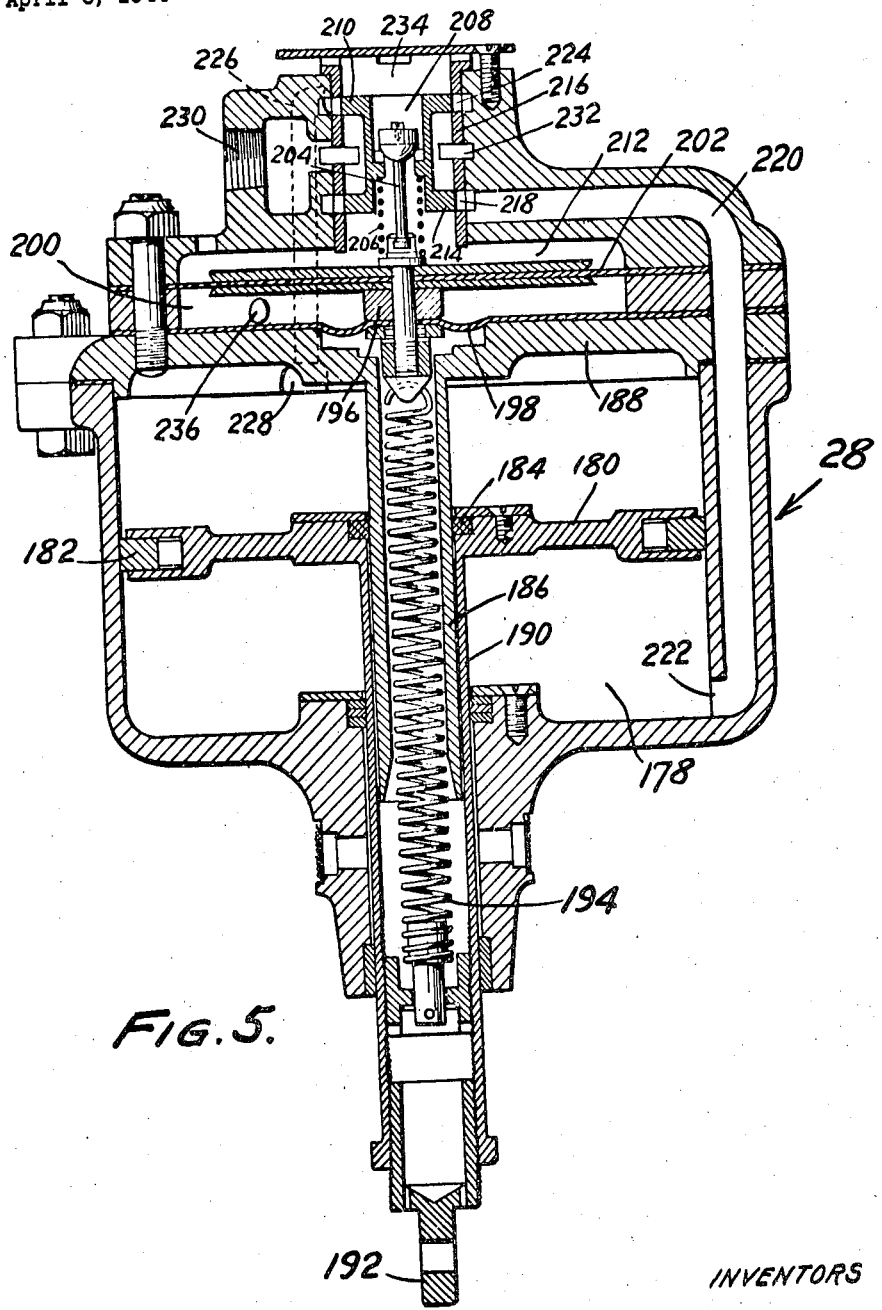
Figure 5 is a vertical sectional view through a pneumatic motor designed to be controlled by the several control elements or relays.

The waste gate operating motor 28 is illustrated in Figure 5 and comprises a cylinder 178 within which there is arranged to slide a piston 180 packed at 182 against the cylinder wall and at 184 against a central guide tube 186 which forms a downward extension of the top 188 of the cylinder. The piston rod takes the form of a tubular extension 190 arranged to be connected at 192 with the waste gate operating lever as hereafter described. Connected at its lower end to the piston rod 190 is a tension spring 194, the upper end of which is connected to the stem assembly 196 which, in turn, is connected to a flexible diaphragm 198 forming the bottom of a chamber 200.

The top of this chamber is provided by a flexible diaphragm 202 also connected to the stem assembly 196. An extension 204 of the stem assembly and a light spring 206 serve to connect to the assembly a slide valve 208 provided with upper and lower flanges 210 and 214, respectively, arranged to slide in a cylindrical insert 216 provided with ports as indicated. A lower port 218 cooperating with the flange 214 is connected through the passage 220 and the opening 222 with the cylinder below the piston 180. An upper port 224 is similarly connected through a passage 226 and opening 228 with the cylinder above the piston 180. A central port 232 communicating with the region between the flanges 210 and 214 has an external connection indicated at 230. Each of the ports described is provided by a series of circumferential slots as will be evident from the drawing. A region 234 within the upper end of the sleeve 216 communicates with the atmosphere and is in free communication through the central portion of the slide valve assembly with the chamber 212 above the diaphragm 202.

The chamber 200 is provided with an external connection indicated at 236.

The motor 28 of Figure 5 is such as to provide a motion of the piston linearly proportional to the difference between the pressure existing in the chamber 200 and atmospheric pressure. Assuming, for example, that the parts are in equilibrium as shown in Figure 5, an increase of pressure in chamber 200 relative to the atmosphere will produce an upward movement of the diaphragm 202 resulting in an upward movement of the slide valve 208. By reason of such movement, the port 224 will be open to communication with the operating supply pressure connected at 230 and, accordingly, air will be admitted to the upper side of the piston through the connections 226 and 228. At the same time the port 218 will be opened so that the lower side of the piston is connected to the atmosphere. As a result of this, the piston will move downwardly, increasing the tension in the spring 194 which will, in turn, cause the assembly 196 and the slide valve 208 to move downwardly, thereby again to establish equilibrium when the increased tension in the spring 194 becomes sufficient to overcome the increased pressure below the diaphragm 202 to bring the slide valve to its initial position closing the ports 214 and 218. Owing to the linear force-displacement characteristic of the spring 194 and the fact that equilibrium is always attained with the stem assembly in the same position, it will be evident that the motion of the piston thus resulting is directly proportional to the difference existing between the pressure in the chamber 200 and atmospheric pressure. As the pressure in the chamber 200 drops relatively to the atmospheric pressure, the reverse operations occur, the lower side of the piston being subjected to the operating pressure and the upper side of the piston being open to the atmosphere with a resulting upward movement of the piston and relief of tension in the spring 194 until equilibrium conditions are again established with the restoration of the slide valve to its neutral port-closing position. The extent of the piston motion will depend upon the stiffness of the spring 194. As will be evident, the position of the piston for a given gauge pressure at 200 may be adjusted by adjustment of the lower anchor of the spring 194.

Figure 6:
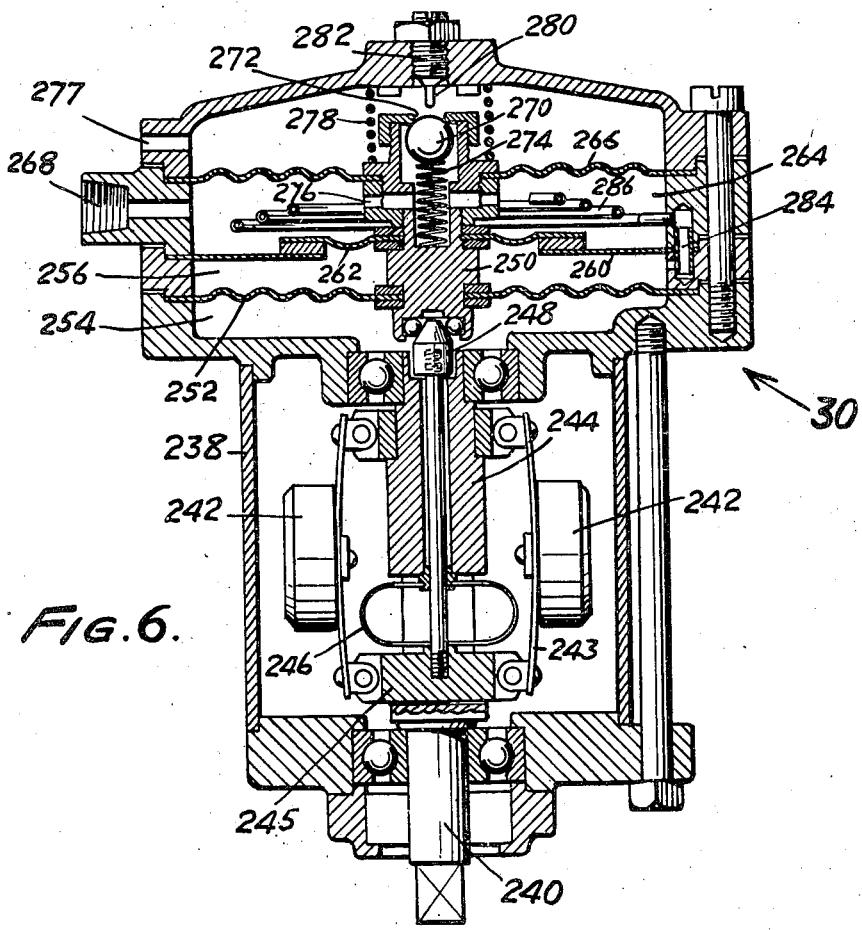
Figure 6 is a vertical sectional view through a speed control element.

The speed control 30 is illustrated in Figure 6. A lower housing 238 encloses a governor arrangement comprising a driven shaft 240, between the upper portion 244 of which and a sliding block 245, there are connected a series of weights 242 through the medium of spring links, 243. A spring 246 normally urges the block 245 downwardly against the centrifugal pull of the weights 242. A stem 248 connected to the block 245 has a ball bearing connection through which it may apply upward pressure to a stem assembly 250. This stem assembly is connected to the central portion of a diaphragm 252 which separates a chamber 254 having free connection with the atmosphere from a chamber 256 closed at its upper side by a rigid diaphragm 260 having a flexible central portion 262 connected to the stem assembly.

A chamber 264 above the chamber 256 is closed at its upper side by a flexible diaphragm 266, centrally connected to the stem assembly, and has an external connection 268. The stem assembly 250 has located therein a ball valve 270 arranged to seat upwardly under the action of a light spring 274 to close an opening 272 which, through lateral passages indicated at 276, will, when the valve is opened, be connected to the chamber 264. A spring 278 presses the stem assembly downwardly. When, however, it moves sufficiently upwardly under the force exerted by the centrifugal weights 242 through the rod 248, the ball 270 will engage the extension 280 of a screw 282 thereby being arrested in its upward movement and permitting opening at 272 as the stem continues to move upwardly. The chamber 264 is thus vented to the atmosphere through the opening 277.

The chambers 256 and 264 are connected through the passage 284 and the capillary tube 286 which, as in the previous elements, is so chosen as to bore and length as to provide the necessary reset resistance between these chambers. As previously mentioned, this connection may also be made adjustable, though, as illustrated, it may have a fixed suitable resistance value to fit the reset characteristics desired.

Figure 1 diagrammatically indicates the relationships of the various elements, the details of which have been described. A connection 290 supplies air from the compressed air passage 6 to the connection 62 of the pressure regulator 22 illustrated in detail in Figure 2. The air at the regulated fixed gauge pressure is delivered from the outlet 66 through the connection 292, having a flow restriction 294, to the controlling devices. A branch 296, for example, joins this line 292 beyond the restriction 294 to the connection 170 of the absolute pressure relay 26. A passage 298 joins the connection 172 of the absolute pressure relay with the connection 110 of the gauge pressure relay 24. It will be noted that by virtue of the elements just mentioned the air from the restriction 294 may flow in series through the connection 170, chamber 152, past valve 162, through chamber 168, connection 172, passage 298, and connection 110 into the chamber 98 of the gauge pressure relay, from which, by passing the valve 94, it may be vented through the outlet 100 to the atmosphere. The valves 162 and 94 are therefore arranged in series for the control of the flow just mentioned.

A branch line 300 runs to the connection 236 of the waste gate motor 28; i. e., it is arranged to connect the chamber 200 of the waste gate motor to the regulated air line beyond the restriction 294. A passage 302 connects the line 300 with the connection 268 of the speed controller 30.

The controlling delivery pressure of the centrifugal compressor is applied through the line 304 and its branches 306 and 308 to the gauge pressure and absolute pressure relays. The branch 306 runs to the connection 108 of the gauge pressure relay. The branch 308 runs to the connection 114 of the absolute pressure relay.

The supply of air for operating the waste gate motor is delivered to its connection 230 through the line 310 from the compressed air delivery conduit 8. The piston rod of the motor 28 is connected as indicated in Figure 1 to a lever arm 312 carried by the shaft of the waste gate 23. While this has been indicated as a simple lever, the actual lever arm and its angular position should be arranged to satisfy the characteristics of the waste gate so as to secure the proper angular opening of the gate to correspond with the motion of the piston of the motor 28. It is desirable in some instances that elaborate linkages be provided with or without cam action in order to secure the desired correspondence.

The operation of the control system will be clear from the consideration of Figure 1, taken together with the detailed showings of the various elements. The pressure applied through the branch connection 306 to the chamber 80 of the gauge pressure relay 24 will tend to move the diaphragm 70 downwardly against the atmospheric pressure exerted on the lower side of the diaphragm and the upward pressure exerted by the adjusted spring 72. This latter being a fixed adjustment for a particular operational setting, it will be evident that the movements of the diaphragm 70 will be substantially proportional to the difference between the absolute pressure in the passage 6 and atmospheric pressure, i. e., substantially proportional to the gauge pressure in the passage 6. If the pressure in the passage 6 increases or the atmospheric pressure falls, it will be evident that the diaphragm 70 will move downwardly, thus permitting the ball valve 94 to drop from its seat 96 to increase the venting opening from the chamber 98 to the atmosphere.

A similar action occurs in the case of the absolute pressure relay 26 wherein the pressure from the passage 6 is delivered through the branch connection 308 to the chamber 112 wherein is located the evacuated chamber 126. The upper side 122 of this evacuated chamber constitutes the movable diaphragm the downward movements under the action of pressure on which are opposed by the spring 136 and 138 subjected to fixed adjustment for the particular operating conditions desired. Accordingly, with increase in absolute pressure in the passage 6, the diaphragm 122 moves downwardly to a substantially proportional extent, thereby increasing the venting action from the chamber 152 past the valve 162 into the chamber 168.

Under conditions of high atmospheric pressure, the absolute pressure relay will be subjected to sufficient pressure to maintain the valve 162 open to such an extent that the venting to atmosphere of the air in the chamber 152 is substantially solely under control of the valve 94. As a result, therefore, of the fixed gauge pressure determined by the pressure regulator 22 in the line 292 and the presence of the flow resistance 294, the pressure resulting in the control line 300 will be substantially constantly proportional to the gauge pressure in the passage 6, the degree of venting past the valve 94, which moves only very slightly with respect to its seat, providing a variable resistance to flow to the atmosphere in accordance with the gauge pressure. As a consequence, the piston 180 will, as described above, in turn take a position which will result, in the case of increase of gauge pressure, in the opening of the waste gate 23 thereby bypassing driving gases from the turbine to reduce the speed of the compressor and thereby reduce the pressure which it will produce in the passage 6. In the event that the gauge pressure drops, a reverse action will occur and the waste gate will be moved toward closed position, thereby to cause more of the engine exhaust gases to flow through the turbine to increase its speed and increase the pressure in the passage 6.

The foregoing control by the gauge pressure relay will continue until there is encountered such atmospheric pressure that the gauge pressure maintained by the action of relay 24 will have an absolute value insufficient to maintain the valve 162 fully open. With reduction of atmospheric pressure beyond this point, the valve 162 will close to such an extent that its effects in offering resistance to venting flow from the chamber 152 will be felt in the system so that it will begin to assume control. As this valve is permitted to close, it will tend to maintain elevated the pressure in the line 300 so as to cause the waste gate motor 28 either to close the waste gate 23 or to maintain it against opening with the result that the gauge pressure in the passage 6 will rise while the absolute pressure therein will remain substantially constant. The rise of the gauge pressure beyond that which the gauge pressure relay 24 seeks to maintain will result in a wide opening of the valve 94 so that from the conditions just mentioned throughout further reduction of atmospheric pressure, the absolute pressure relay 26 assumes control of the operation and the waste gate will be closed or opened to such an extent as now to maintain a substantially fixed absolute pressure.

Throughout the foregoing it has been assumed that the speed of the turbo-compressor combination was not required to become excessive to maintain the desired gauge or absolute pressure. Under such conditions, the valve 270 of the speed control unit 30 will not have risen sufficiently to engage the fixed abutment 280. Whenever the speed of the turbo-compressor exceeds a predetermined value; however, the stem assembly of the speed controller will rise sufficiently to cause the ball 270 to engage the abutment and open the vent passage at 272 thereby to vent the line 300 through the connection 382 to the atmosphere. The reaching of such speed condition will result in drop of pressure in the chamber 200 of the waste gate motor with the result that the piston will move upwardly to open the waste gate, bypassing more of the driving gases and thus reducing the speed of the turbo-compressor. The result of the arrangement, therefore, is to cause the speed controller to override both of the pressure controls to insure that the speed of the turbo-compressor remains within safe limits.

The above description has been made without reference to the action of the flow restrictions 106, 176, and 286. During the control action heretofore described, in the absence of these and the closed chambers with which they connect, the pressure in line 300 would be maintained substantially proportional to the deviation in the absolute and gauge pressure from the control points represented by the adjustments of the relays 26 and 24, respectively. In view of the substantially linear relationship between pressure in line 300 and the position of the waste gate motor piston, it follows that the piston position would be substantially proportional to the pressure deviation from the pressure control point established by one or the other of the pressure relays. This action is characteristic of what is commonly termed "proportional position control."

The influence of chamber 148 and the resistance 176 which connects it with chamber 152 is to add to the proportional position control action which is commonly termed a "floating control action." The combined effect of these two actions will be explained in the following paragraphs.

On an assumed sudden change to a higher altitude having caused a corresponding reduction in the suction pressure of the compressor and a consequent drop in its outlet pressure at 6, a partial closure of the waste gate is required to direct enough combustion gases to the turbine to bring the pressure at 6 back where it belongs. However, insofar as chamber 152 alone is concerned, a deviation in pressure from the control point is necessary in order to hold the waste gate farther closed. Consequently, chamber 152 by itself could never restore the pressure exactly to its desired value. The pressure would stabilize at some new value deviating from the original by an amount which is commonly referred to as the "droop."

Whereas, the pressures in chambers 152 and 148 were originally identical, a decrease in pressure in 152 makes its pressure lower than that in 148. Consequently, air flows slowly through the resistance between them, decreasing the pressure in 148. This decrease opens the pilot valve still farther and the pressure in 152 declines more. The waste gate closes to correspond and directs still more gas to the turbine. This slow floating control action (also known as automatic reset) continues until the pressure at 6, the initial spring force, and the equality between pressures in chambers 148 and 152 have once more been restored. Now, however, the common pressure in chambers 148, 152 is lower than it was before, by the amount required to hold the waste gate in a new position at which it directs just the additional gas to the turbine which is required to maintain the compressor output pressure at 6 at its initial value in spite of the shift to higher altitude conditions which has been assumed.

Similar actions occur in the cases of the other flow restrictions and chambers.

Figure 7:
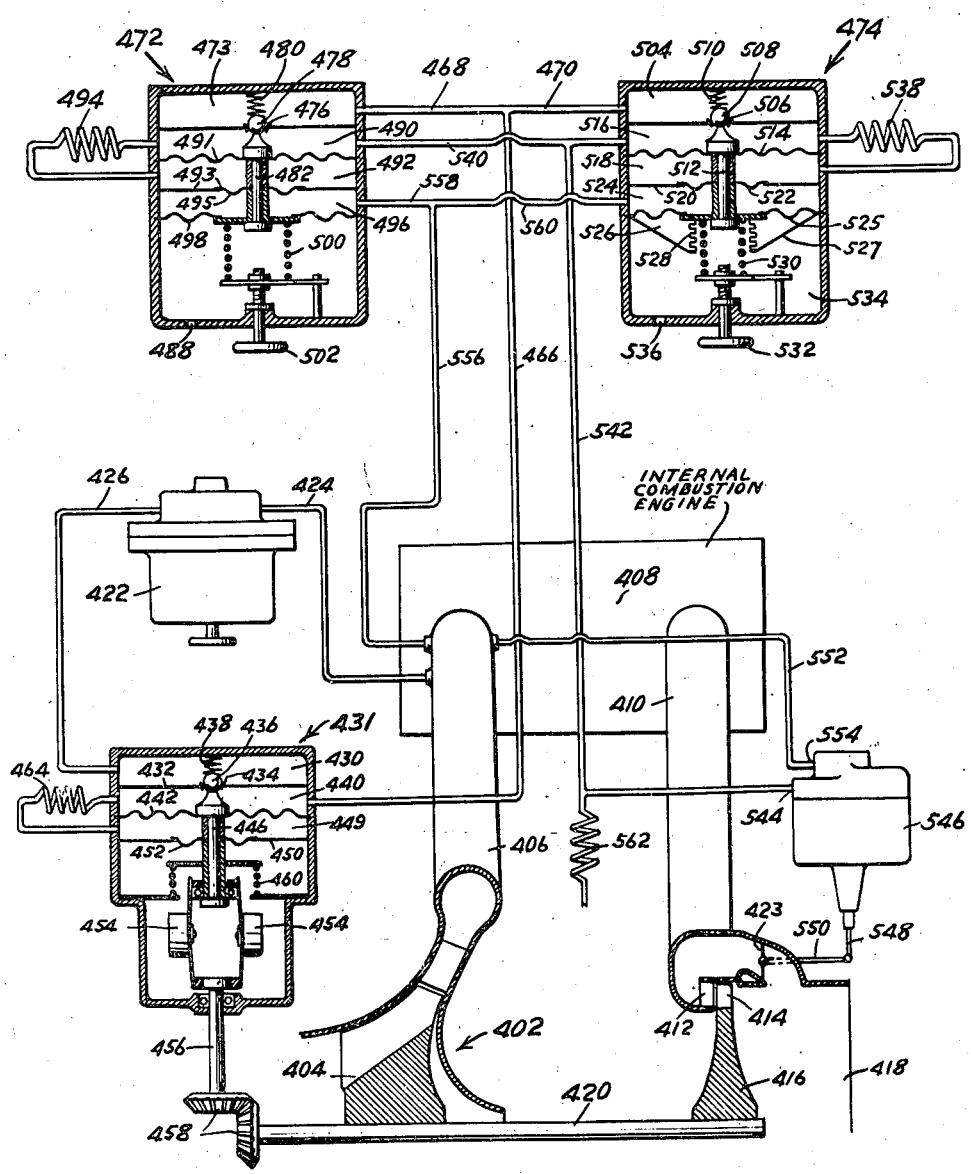
Figure 7 is a diagram similar to Figure 1 but showing an alternative control system substantially equivalent to that of Figure 1 from the standpoint of ultimate results secured thereby.

The system of Figure 1 involves the provision of the relays 24 and 26 in series, in parallel with which arrangement is the speed control relay 30. In Figure 7 there is illustrated an alternative control system in which absolute and gauge pressure controls are arranged in parallel to each other, but together in series with a speed controller.

Referring to the modification of Figure 7, there is illustrated a supercharging system for an internal combustion engine essentially the same as that shown in Figure 1 and comprising a centrifugal compressor 402 having an impeller 404 and arranged to deliver supercharging air through the passage 406 to the carbureting arrangement of an engine 408, the exhaust gases from which, delivered through the passage 410, flow through the nozzles 412 and buckets 414 of the turbine 416 to be discharged through the tail passage 418. A shaft 420 carries the turbine rotor and the impeller. A waste gate 423 is arranged to adjust the quantity of driving gases bypassing the turbine.

The control system in this case comprises a pressure regulator 422 identical with the regulator 22 illustrated in Figure 2 arranged to receive compressed air through the connection 424 and deliver it through passage 426 to the uppermost chamber 430 of a speed controller 431. The chamber 430 is closed by a lower rigid wall 432 provided with a vent opening defined by a seat 434 on which rests a ball valve 436 under the action of a light spring 438. Below the wall 432 is a chamber 440 the lower side of which is constituted by a flexible diaphragm 442 connected to a solid stem 446. The upper end of this stem is formed as an abutment adapted to engage the ball 436 and at speeds of operation of the shaft 420 below a certain limiting value, is arranged to hold the ball 436 upwardly off the seat 434 so as to provide passage for air from the chamber 430 to the chamber 440.

Below the chamber 440 is a chamber 449 which is closed by a rigid diaphragm 450 having a flexible central portion 452 connected to the stem 446. The lower end of the stem 446 is provided with a thrust bearing arranged to be engaged by a collar connected through suitable flexible or spring linkage to governor weights 454 connected, in turn, to the shaft 456 which is joined through the gearing indicated at 458 to the shaft 420. The arrangement is such that as the speed increases, the outward movement of the weights 454 will exert a downward force upon the stem 446 to permit the ball 436 to seat at 434. A spring 460 opposes this movement and tends normally to maintain the ball 436 unseated. A flow restriction diagrammatically indicated at 464 joins the chambers 440 and 449 and serves to provide an isoposic action as above indicated. The details of construction of the relay 431 may follow, except for certain reversals of parts, essentially the details of construction of the pressure regulator of Figure 2 and the speed control of Figure 6, and it will be sufficient, therefore, for present purposes, to indicate this relay solely in the diagrammatic fashion of Figure 7.

The chamber 440 of the relay 431 is connected to the gauge and absolute pressure relays through the line 466 and its branches 468 and 470. The branch 468 communicates with the uppermost chamber 473 of the gauge pressure relay 472. This upper chamber is provided with a rigid lower wall having an opening 476 in which the ball valve 478 seats under the action of the light spring 480. A stem 482 provides at its upper end an abutment engageable with the ball 478. A flexible diaphragm 491 connected at its central portion to the stem 482 defines a chamber 490 below the chamber 474, while below the diaphragm 491 is a chamber 492 the lower side of which is defined by the diaphragm 493 which is rigid except for a flexible central portion 495 connected to the stem. Below the diaphragm 493 is another chamber 496 the lower side of which is defined by a flexible diaphragm 498 also connected to the stem. A compression spring 500 subject to adjustment by a screw 502 acts upwardly upon the stem 482. The lowermost chamber within which the spring 500 is located is vented to the atmosphere at 488. Chamber 492 connected with chamber 490 by flow restriction 494 provides floating control action.

The absolute pressure relay 474 is of somewhat similiar construction and comprises an uppermost chamber 504 with which the branch line 470 communicates. A rigid wall closes the under side of this chamber, being provided with an opening 506 in which the ball valve 508 is arranged to seat under the action of the light spring 510. A chamber 516 located below this wall has its lower side formed by a flexible diaphragm 514 connected to a stem 512 formed at its upper end as an abutment arranged to engage the lower side of the ball valve 508. Below the chamber 516 is another chamber 518, the lower side of which is constituted by a rigid diaphragm 520 having a flexible central portion 522 connected to the stem 512. Below the diaphragm 518 is another chamber 524 the lower side of which is formed by a flexible diaphragm 525 connected to the stem. Below this diaphragm is an evacuated chamber 526 having a rigid lower wall 527 and defined centrally by a flexible bellows 528 the upper end of which is connected to the stem. A compression spring 530 subject to adjustment by means indicated at 532 serves to urge the stem 512 upwardly. The chamber 534 in which the spring 530 is located is open to the atmosphere at 536.

Chamber 518 connected with chamber 516 by flow restriction 538 provides floating control action.

The chambers 490 and 516 of the relays 472 and 474 are connected by a line 540 which is, in turn, joined through the line 542 to the control opening 544 of the waste gate motor 546. This waste gate motor may be identically the same as that illustrated in Figure 5 and the connection 544 corresponds to the connection 236 of that figure. This piston rod 548 is connected to the waste gate 423 through the arm 550 and, as in the case of the previous modification, this connection may be so arranged as to secure a proper relationship between the piston movement and the waste gate position.

The air supply for the operation of the waste gate motor is led to it through the connection 552 from the passage 406, the connection 554 at the motor corresponding to that indicated at 230 in Figure 5.

The pressure from the passage 406 is applied to the relays 472 and 474 through the passage 556 and its respective branches 558 and 560 which communicate with the chambers 496 and 524.

The line 542 is vented to the atmosphere through the flow resistance 562.

In the operation of the system of Figure 7, it will be evident that pressure from the regulator 422 is applied to the waste gate motor 546 when the vent 434 of the speed controller 431 is open and simultaneously one or both of the vents 476 and 506 of the gauge pressure relay 472 and the absolute pressure relay 474 are open. Under these conditions, a control pressure will be applied to the waste gate motor having a value dependent upon the ratio of the total resistance offered by the vents in the three controls to the resistance 562 which permits a constant bleeding of air from the line 542 to the atmosphere.

Assuming, as in the case of the modification of Figure 1, the operation of the controls as higher altitudes are reached beginning at a low level, the following sequence of controlling actions occurs:

So long as the turbo-compressor speed is sufficiently low, the relay 431 will be ineffective to give any control action since the ball 436 will be lifted clear of its seat and little resistance to air flow will exist thereat. On the other hand, if, under any condition, the speed increases abnormally, the stem 446 will be pulled downwardly by the centrifugal governor and the ball 436 will be permitted to seat thus closing off the supply of air to the line 466 with the result that the air in the system including that in the control chamber of the waste gate motor may escape to atmosphere through the resistance 562 to effect opening of the waste gate valve. The controller 431 maintains substantially constant speed of the supercharger under conditions when the pressure relays would demand higher than safe speeds.

At low altitudes, the absolute pressure existing in the connection 406 will be so high as to hold lowered the stem 512 of the absolute pressure relay to such an extent as to permit complete closure of the valve 508. Accordingly, the control of air to the waste gate motor is then solely effected by the gauge pressure relay 472. This relay, as will be evident from its construction, will under these conditions cause a restricting action of the ball 478 to occur to such an extent as to properly maintain the desired position of the waste gate to secure the required gauge pressure. Continuous leakage of air occurs through the resistance 562, and the control pressure exerted on the waste gate motor will depend upon the relationship between the resistance 562 and that at the valve 478.

As the atmospheric pressure decreases with increase of altitude, there will be reached a point where the absolute pressure in the passage 406 corresponding to the gauge pressure theretofore maintained will be insufficient to maintain the valve 508 fully seated and the stem 512 will raise this valve off its seat so that the absolute pressure relay begins to exercise some control which, through a limited range of atmospheric pressure, will be jointly assumed by both the gauge and absolute pressure relays. With further decrease of atmospheric pressure the pressure demanded by the absolute pressure relay will cause the gauge pressure to exceed substantially the limit set by the gauge pressure relay with the result that valve 478 will be completely seated leaving the control entirely to the absolute pressure relay. Thus, the ultimate effect of the system of Figure 7 is essentially similar to that of the system of Figure 1.

While the relay systems so far described have particular utility in effecting proper control of a turbo supercharger system, it will be evident that the relay systems are of more general application. They can, for example, be used to effect the control of a motor-driven compressor output in which case what has been described as the waste gate motor may be used to adjust a rheostat in the motor circuit. If a motor having a limiting speed characteristic is used, the speed controller may not be necessary, but if, for example, a series motor is used the speed controller may be utilized to insure against excessive speeds upon abnormal reduction of compressor load.

While in the modifications described the gauge pressure relays are provided with linear springs (72, 500) and therefore maintain substantially constant gauge pressures of air delivered by the compressors, it will be evident that these springs need not be linear but may be of non-linear (e. g., conical) type, in conjunction with valve arrangements having substantial movements between fully open and fully closed positions (for example, slide valves), to give rise to controlled pressure of the compressor delivery which may be functions of the atmospheric pressure through the range of gauge pressure control.

The relay systems are of even broader application for the control of various devices, the control of which is to be subject successively to a plurality of signals. The series and parallel arrangements of relays described specifically with reference to Figures 1 and 7 may be multiplied indefinitely to secure as many successive control actions as may be desired, combined if necessary with overriding control analogous to that specifically shown as effected by excessive speed. It will, further, be evident that the relay systems described are adapted to liquid as well as elastic fluid control.

It will be understood, therefore, that the invention is not to be construed as limited except within the scope of the following claims.

What we claim is:

1. In combination, a compressor, means for driving the compressor, and means for controlling the driving means to maintain, through one range of pressure of elastic fluid supplied to the compressor, a substantially constant gauge pressure of the elastic fluid delivered by the compressor relative to the supply pressure, and means for controlling the driving means to maintain, through another range of pressure of the elastic fluid supplied to the compressor, a substantially constant absolute pressure of the elastic fluid delivered by the compressor.

2. In combination, a compressor, means for driving the compressor, means for controlling the driving means to maintain, through one range of pressure of elastic fluid supplied to the compressor, a substantially constant gauge pressure of the elastic fluid delivered by the compressor relative to the supply pressure, and means for controlling the driving means to maintain, through another range of pressure of the elastic fluid supplied to the compressor, a substantially constant absolute pressure of the elastic fluid delivered by the compressor, and means for limiting the speed of the compressor.

3. In combination, a compressor, means for driving the compressor, and means for controlling the driving means to maintain, through one range of pressure of elastic fluid supplied to the compressor, a pressure of elastic fluid delivered by the compressor bearing a predetermined relation to the elastic fluid supplied to the compressor, and means for controlling the driving means to maintain, through another lower range of pressure of the elastic fluid supplied to the compressor, predetermined absolute pressure values of the elastic fluid delivered by the compressor.

4. In combination, a compressor, means for driving the compressor, means for controlling the driving means to maintain, through one range of pressure of elastic fluid supplied to the compressor, a pressure of elastic fluid delivered by the compressor bearing a predetermined relation to the elastic fluid supplied to the compressor, and means for controlling the driving means to maintain, through another range of pressure of the elastic fluid supplied to the compressor, predetermined absolute pressure values of the elastic fluid delivered by the compressor, and means for limiting the speed of the compressor to a predetermined maximum value.

5. In combination, a compressor, means for driving the compressor, and means for controlling the driving means to effect operation of the compressor in accordance with different predetermined laws during existence of different ranges of values of a variable condition, the last means comprising a fluid operated motor and a plurality of relays operating successively during the respective existence of said different ranges of values of the variable condition, said relays controlling in series the flow of operating fluid to the motor.

6. In combination, a compressor, means for driving the compressor, and means for controlling the driving means to effect operation of the compressor in accordance with different predetermined laws during existence of different ranges of values of a variable condition and for limiting the speed of the compressor, the last means comprising a plurality of relays operating successively during the respective existence of said different ranges of values of the variable condition and another relay responsive to speed of the compressor.

7. In combination, a compressor, means for driving the compressor, and means for controlling the driving means to effect operation of the compressor in accordance with different predetermined laws during existence of different ranges of values of a variable condition and for limiting the speed of the compressor to a predetermined maximum value, the last means comprising a controlling motor, a plurality of relays operating successively during the respective existence of said different ranges of values of the variable condition and another relay responsive to speed of the compressor, the successively operating relays controlling in series the flow of energy to the controlling motor and being in parallel with the speed responsive relay.

8. In combination, a compressor, means for driving the compressor, and means for controlling the driving means to effect operation of the compressor in accordance with different predetermined laws during existence of different ranges of values of a variable condition and for limiting the speed of the compressor to a predetermined maximum value, the last means comprising a controlling motor, a plurality of relays operating successively during the respective existence of said different ranges of values of the variable condition and another relay responsive to speed of the compressor, the successively operating relays being arranged in parallel with respect to each other and in series with the speed responsive relay to control flow of energy to the controlling motor.

9. In combination, a compressor, means for driving the compressor, and means for controlling the driving means to effect operation of the compressor in accordance with different predetermined laws during existence of different ranges of values of a variable condition and for limiting the speed of the compressor to a predetermined maximum value, the last means comprising a controlling motor, a plurality of relays operating successively during the respective existence of said different ranges of values of the variable condition and another relay responsive to speed of the compressor, the successively operating relays being arranged in parallel with respect to each other and the speed responsive relay to control flow of energy to the controlling motor.

10. In combination, a compressor, means for driving the compressor, and means for controlling the driving means to effect operation of the compressor in accordance with different predetermined laws during existence of different ranges of values of a variable condition and for limiting the speed of the compressor to a predetermined maximum value, the last means comprising a fluid operated motor, a plurality of relays operating successively during the respective existence of said different ranges of values of the variable condition and another relay responsive to speed of the compressor, the successively operating relays controlling in series the flow of operating fluid to the motor and being in parallel with the speed responsive relay.

11. In combination, a compressor, means for driving the compressor, and means for controlling the driving means to effect operation of the compressor in accordance with different predetermined laws during existence of different ranges of values of a variable condition and for limiting the speed of the compressor to a predetermined maximum value, the last means comprising a fluid operated motor, a plurality of relays operating successively during the respective existence of said different ranges of values of the variable condition and another relay responsive to speed of the compressor, the successively operating relays being arranged in parallel with respect to each other and in series with the speed responsive relay to control flow of operating fluid to the motor.

12. In combination, a compressor, means for driving the compressor, and means for controlling the driving means to effect operation of the compressor in accordance with different predetermined laws during existence of different ranges of values of a variable condition and for limiting the speed of the compressor to a predetermined maximum value, the last means comprising a fluid operated motor, a plurality of relays operating successively during the respective existence of said different ranges of values of the variable condition and another relay responsive to speed of the compressor, the successively operating relays being arranged in parallel with respect to each other and the speed responsive relay to control flow of operating fluid to the motor.

13. In combination, a compressor, means for driving the compressor, and means for controlling the driving means to maintain, through one range of pressure of elastic fluid supplied to the compressor, a substantially constant gauge pressure of the elastic fluid delivered by the compressor relative to the supply pressure, and means for controlling the driving means to maintain, through another lower range of pressure of the elastic fluid supplied to the compressor, a substantially constant absolute pressure of the elastic fluid delivered by the compressor.

14. In combination, a compressor, means for driving the compressor, means for controlling the driving means to maintain, through one range of pressure of elastic fluid supplied to the compressor, a substantially constant gauge pressure of the elastic fluid delivered by the compressor relative to the supply of pressure and means for controlling the driving means to maintain, through another lower range of pressure of the elastic fluid supplied to the compressor, a substantially constant absolute pressure of the elastic fluid delivered by the compressor, and means for limiting the speed of the compressor.

15. In combination, a compressor, means for driving the compressor, and means for controlling the driving means to effect operation of the compressor in accordance with different predetermined laws during existence of different ranges of values of a variable condition, the last named means comprising a fluid operated motor and a plurality of relays operating successively during the respective existence of said different ranges of values of the variable condition, fluid supply connections to each of said relays, and fluid connections from each of said relays to said fluid operated motor, each of said relays including a valve controlling flow of fluid from its supply connection to its connection to said fluid operated motor, said relays being thus arranged in parallel to control flow of operating fluid to the motor.

WINFIELD B. HEINZ.
ARTHUR E. KITTREDGE.
JOHN G. WILLIAMS.

REFERENCES CITED

The following references are of record in the file of this patent:

UNITED STATES PATENTS

| Number | Name | Date |
|---|---|---|
| 1,310,683 | Sherbondy | July 22, 1919 |
| 1,346,563 | Sherbondy | July 13, 1920 |
| 1,346,564 | Sherbondy | July 13, 1920 |
| 1,508,707 | Moss | Sept. 16, 1924 |
| 1,508,731 | Standerwick | Sept. 16, 1924 |
| 1,511,489 | Armstrong | Oct. 14, 1924 |
| 1,557,793 | Berger, et al. | Oct. 20, 1925 |
| 2,148,230 | Berger | Feb. 21, 1939 |
| 2,216,699 | Berger | Oct. 1, 1940 |
| 2,283,175 | Berger | May 19, 1942 |
| 2,374,708 | Shoults | May 1, 1945 |
| 2,376,143 | Edwards, et al. | May 15, 1945 |